March 4, 1924.
J. SCHMIDT ET AL
1,485,889
SAFETY DEVICE FOR AUTOMOBILES
Filed March 18, 1921
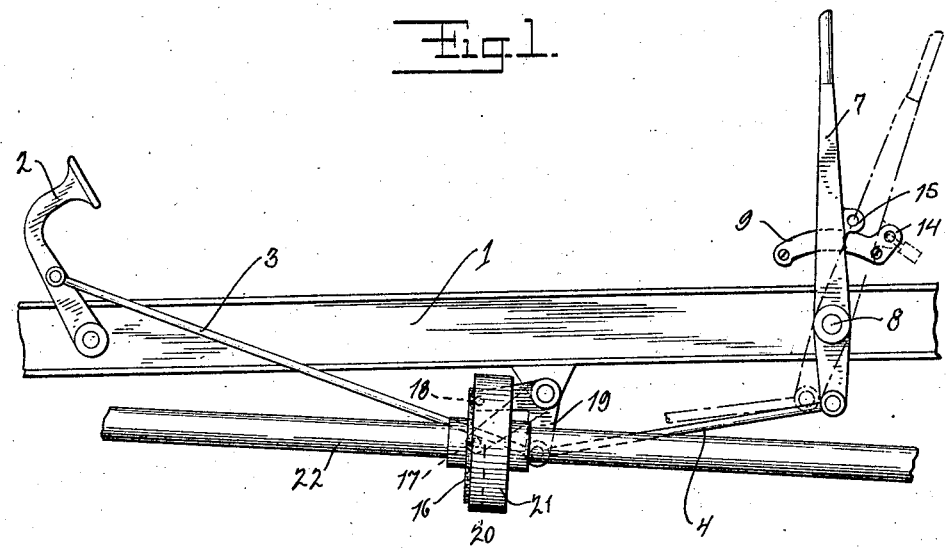
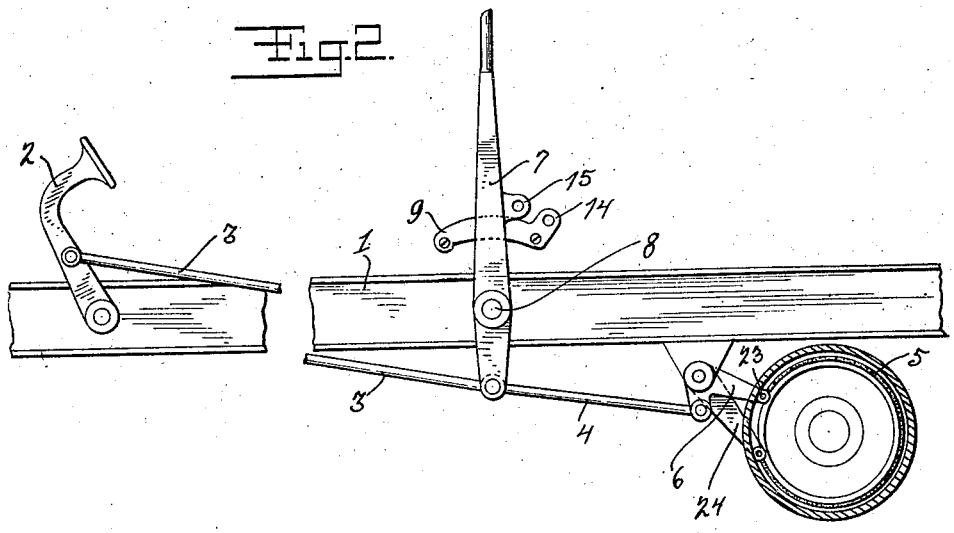
Inventors
Julius Schmidt
Edmund Schmidt
By their Attorney Patented Mar. 4, 1924.

1,485,889

UNITED STATES PATENT OFFICE.

JULIUS SCHMIDT AND EDMUND SCHMIDT, OF BROOKLYN, NEW YORK.

SAFETY DEVICE FOR AUTOMOBILES.

Application filed March 18, 1921. Serial No. 453,469.

*To all whom it may concern:*

Be it known that we, JULIUS SCHMIDT and EDMUND SCHMIDT, citizens of the United States, residing at Brooklyn, in the county of Kings and State of New York, have invented certain new and useful Improvements in Safety Devices for Automobiles, of which the following is a specification.

The main object of this invention is the provision of an auxiliary attachment to the safety and emergency brake of an automobile operable by a passenger occupying the rear seat.

The above and other objects will become apparent in the description below, in which like-named characters of reference refer to like-named parts in the drawings.

Referring briefly to the drawings, Fig. 1 is a fragmentary view of an automobile frame equipped with one form of the appliance.

Fig. 2 is a similar view showing another form of the appliance.

Referring now in detail to the drawings, the numeral 1 represents generally the chassis frame of the vehicle and 2 the ordinary clutch pedal. A brake lever 7 is pivotally mounted at 8 to the frame 1, in front of the rear seat of the vehicle.

A rod 4 is pivotally mounted to the lower extremity of the lever 7, and as shown in Fig. 2 extends rearward and is pivoted to a bell crank 6 connected in the usual manner to one end of a brake band at 23, said band lying within the brake drum of the "internal" type, the other end of said band being secured to a support 24. It is now apparent, in the event that the handle 7 is grasped at the upper end, and moved rearward, it will apply the internal brake 5. If it is desired to prevent theft of the car when idle, the shackle of a lock may be passed thru the holes or eyelets 14 and 15 on ears rigid with the sector 9 and handle 7 respectively.

In Fig. 1 is shown a form of device applicable to a vehicle having no provision for an internal brake. In this form a drum 16 is mounted on the drive shaft 22, and a brake band 21 is mounted about said drum, having one end secured at 17 to a rigid support 20, and the other end secured at 18 to one of the arms of a pivoted bell crank 19 fixed to the frame. The other arm of said crank is pivotally attached to both the rod 3 leading from the clutch pedal 2 and the rod 4 leading to the auxiliary brake lever 7, as before. Thus if the lever 7 be drawn rearwardly the band 21 will be contracted about the drive shaft 22 and thus check the propelling force of the car causing the same to come to a stop.

By use of our device it is apparent that many accidents may be avoided, such, for instance, as may be possible in case the driver should become ill or the car should get beyond his control.

We claim:

A vehicle brake comprising a brake drum adapted to be mounted on a transmission shaft, a flexible brake band partly encircling said drum, one end of said band being rigidly held on the vehicle frame and the other being free, a bell-crank fulcrumed on the frame of the vehicle, one arm of said bell-crank being pivotally connected to the free end of the brake band, a hand lever in the rear of the brake drum fulcrumed intermediate its length, a rod connecting said hand lever to the bell-crank, said lever having an eye thereon, a sector rigid on the vehicle frame having an eye therein, the eyes of the hand lever and sector when aligned being adapted to receive means for locking the brake band, a foot lever pivoted forward of the brake drum, a rod connecting the foot lever and bell crank.

In witness whereof we affix our signatures.

JULIUS SCHMIDT.
EDMUND SCHMIDT.